United States Patent [19]

Oettl

[11] 4,334,813
[45] Jun. 15, 1982

[54] DEVICE FOR FASTENING AN OBJECT AGAINST A WALL OR THE LIKE

[75] Inventor: Reinhold Oettl, Nufringen, Fed. Rep. of Germany

[73] Assignee: Stumpp & Kurz GmbH & Co., Stuttgart, Fed. Rep. of Germany

[21] Appl. No.: 66,742

[22] Filed: Aug. 15, 1979

[30] Foreign Application Priority Data

Aug. 19, 1978 [DE] Fed. Rep. of Germany ....... 2836347

[51] Int. Cl.³ ............................................. F16B 13/06
[52] U.S. Cl. ......................................... 411/68; 411/75
[58] Field of Search ....................... 411/42, 43, 45, 44, 411/48, 54, 63, 64, 67, 68, 75

[56] References Cited

U.S. PATENT DOCUMENTS

| | | | |
|---|---|---|---|
| 839,705 | 12/1906 | Bennett | 411/68 |
| 1,407,782 | 2/1922 | Church et al. | 411/68 |
| 1,752,752 | 4/1930 | Ogden | 411/68 |
| 3,448,651 | 6/1969 | Passer | 411/42 |
| 3,683,741 | 8/1972 | Pete | 411/68 |
| 4,195,547 | 4/1980 | Gianuzzi | 411/54 |

FOREIGN PATENT DOCUMENTS 2352979 12/1977 France ................................. 411/55

Primary Examiner—Thomas J. Holko
Attorney, Agent, or Firm—Edwin E. Greigg

[57] ABSTRACT

The device for fastening an object to a wall or the like by a push-in mounting, comprises an externally threaded bolt, at one end of which a nut can be threadedly advanced, and on the other end which is at least partially conical and whose maximum diameter is at most equal to the diameter of the bolt, has displaceably mounted thereon an expander element composed of two half-shell like parts. The two parts of the expander element are provided at their longitudinal edges opposite to one another in the mounted condition with integral lobes disposed transversely symmetrical and, when viewed in development, point-symmetrical, in relation to one another. The edges of the lobes are formed in such a way as to provide, when disposed on the externally threaded bolt, a form-locking connection.

19 Claims, 8 Drawing Figures

DEVICE FOR FASTENING AN OBJECT AGAINST A WALL OR THE LIKE

BACKGROUND OF THE INVENTION

The present invention relates to a device for fastening an object to a wall, or the like, as a plug-in mounting, including an externally threaded mounting bolt one end of which is formed into a partial cone whose maximum diameter at most is equal to the diameter of the remainder of the bolt body, and the other end of which is threaded.

Such fastening devices which are also described as so-called externally threaded pegs or tie bolts, are pushed into a hole in a wall or the like of concrete, masonry or the like and there secured, the hole having substantially the same diameter as the holes provided in the object to be fastened.

Fastening devices which consist of dowels or wood screws are different in that the screw diameter corresponds to the diameter of the hole in the object to be fastened, while the hole in the wall for the dowel is of larger diameter. In this case, an expander element is provided for fastening the externally threaded peg into the hole. In its frontal position the peg can be driven, with the bolt, into the hole and then expanded so that the taper of the bolt will be moved through by axial displacement.

A fastening device of the kind disclosed in U.S. Pat. No. 3,766,819 has half-shell expander element parts of like form, but when assembled with the bolt at the operating site at which the fastening device is assembled, are appropriately sorted out, that is to say brought into the correct position and orientation. This is, however, very difficult because they are not easy to dispose of in this way and the operation has to be carried out by hand.

OBJECT AND SUMMARY OF THE INVENTION

It is an object of the present invention therefore to provide a fastening device of the kind set forth in which the two parts of the expander device, which are each of half-shell form, can be fed in and mounted on the externally threaded mounting bolt mechanically.

This object is achieved by the present invention by the provision of an expander element which is transversely symmetrical and, when viewed in development, is point symmetrical. The expander element is mounted on the mounting bolt in a radially form-locking manner.

In the fastening device according to the present invention, therefore, the parts of the expander device are preformed and hardened in accordance with their status in the assembled condition. Since they are point-symmetrical, they are all of the same construction and can be introduced onto the outer threaded mounting bolt in the final assembly with either end leading. This makes it possible for the parts of the expander element to be sorted or assembled automatically, that is to say mechanically. The lobes provided on the parts of the expander element on the one hand have the effect that the parts cannot shift axially relatively to one another, so that their position always remains uniform relatively to the taper, and on the other hand, as a result of their profiling, have the effect that these two parts constituting the expander elements are held in the radial direction against parting. This form-locking connection, possibly with play, in the radial direction is either produced by the fact that the two parts snap into one another, the lobes being slightly elastically deformable in the axial direction, or by the fact that when the two parts are laid on the bolt the end lobes are slightly plastically deformed in the axial direction so that the adjacent lobes engage one in the other.

In other preferred embodiments of the present invention the lobes are of differing radius at the plane of separation in the expander element so that some of the lobes in the assembled condition overlap the outer diameter of the externally threaded bolt and thereby deform barb-like edge portions which, at the commencement of the pull-out movement of the threaded bolt hold the expander element in the fastening hole concerned. These barb-like edge portions can be made very simply in the manufacture of the parts of the expander element in a single operation with the bending of sheet which has been stamped out.

Further details and forms of the invention are to be found in the following description in which the invention will be described and explained in relation to the exemplary embodiments thereof which are illustrated in the accompanying drawings.

DESCRIPTION OF THE PREFERRED EMBODIMENTS

Figure 1:
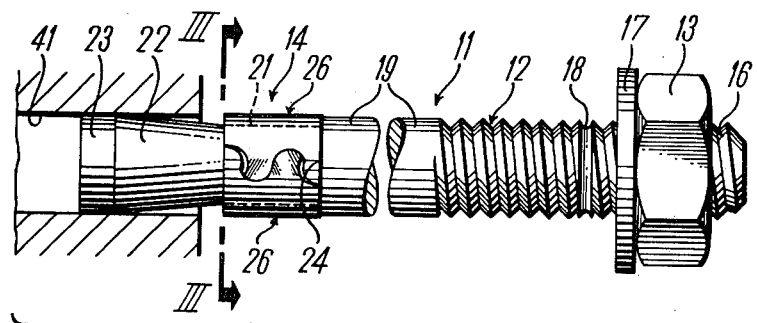
FIG. 1 is a side view of a fastening device in the assembled condition in accordance with one embodiment of the present invention.

The fastening device, or externally threaded plug or tie bolt 11 according to the invention is used to secure objects by so-called plug-in mountings on a wall, to a roof or the like of concrete, masonry or the like. The expression "plug-in mounting" is used to refer to the fact that the device 11 is pushed, or driven in through the object placed against the wall or the like and is then tightened. Since the attachment hole in the wall is approximately the same diameter as the fastening holes in the object to be fastened, the device 11 can be used as a template for indicating and forming of the fastening holes.

The externally threaded fastening device, plug or tie bolt 11 comprises essentially an externally threaded mounting bolt 12, a nut 13 and an expander element 14. The nut 13 which is used to tighten the inserted threaded bolt 12, which is threaded on an outer threaded part 16, with the insertion of a support washer or shim 17; and when the threaded bolt 12 is inserted, is generally tightened to such an extent that a marker ring 18 of the threaded part 16 is seen. Adjoining the threaded part 16 is a shank 19 of the bolt which at its rear or inner end merges into a cylindrical section 21 of smaller diameter. The cylindrical section 21 receives the expander element 14 and is of a length which is approximately the width of the element 14. Adjoining this cylindrical section 21 is the small diameter end of a cone 22 which merges into a cylindrical end 23 with a diameter equal to that of the shank 19.

The expander element 14 comprises two identical substantial half-shell parts 26, 26' or 26" which are of such form and are so attached to the outer externally threaded bolt 12 that in the first place they cannot be displaced axially relative to one another, and they hold together on the bolt in a form-locking manner and against displacement in the radial direction, that is to say they are secure against radial separation.

Figure 2:
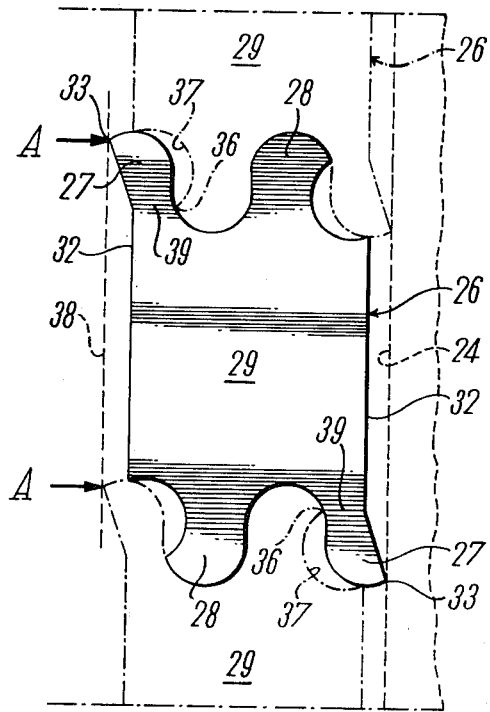
FIG. 2 is a plan view of an expander element shown developed, but before the form-locking connection of the two parts of the expander element in accordance with an embodiment of the present invention.

As can be seen particularly from FIGS. 2, 4 and 6 each expander element part 26, 26', 26" is punched from a flat metal sheet to give it a basically rectangular shape with two lobes 27, 27' and 27" and 28, 28', and 28" at the longitudinal sides thereof. The end lobes 27, 27' and 27" and the central lobes 28, 28', and 28" are formed or punched out at the two longitudinal sides in such a way that the parts 26, 26', 26" are of point-symmetrical form as seen in the developed views, which means that each expander element part 26, 26', 26" in relation to its lobes can have only one position, that is to say is always correctly positioned. Each expander element part 26, 26', 26" is also transversely symmetrical (see FIGS. 3 and 5). The parts 26, 26', 26" are bent from the flat condition into a cylindrical half-shell form as can be seen in the views given in FIGS. 3 and 5. The central body part 29 of the parts 26, 26', 26" which does not make a complete half shell is provided with an internal radius corresponding to the outer radius of the cylindrical area 21 of the bolt 12. The lobes 27, 27', 27" and 28, 28', 28" overlap at the plane of separation 31 of the element 14 shown in FIGS. 3 and 5 in such a manner that they are approximately halved in length by this plane.

Figure 3:
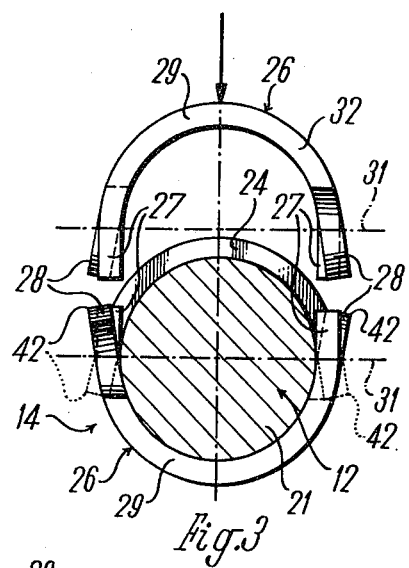
FIG. 3 is a section on the line III—III of FIG. 1, but the parts being shown in the condition they assume during the imposition of the parts of the expander element on the part, the finally assembled condition being indicated in dotted lines.

In the embodiment illustrated in FIG. 3 the half shells 26, 26' can be positioned directly on the cylindrical area of the bolt 12 because the lobes 27, 27', 28, 28', at least at the end overlapping the plane 31, are of larger radius. It is apparent from FIG. 3 that the lobes 27 extending from the body part 29 of the half shell part 26 extend to some extent beyond the plane 31 in a straight line and therefore have an inner spacing of the same order as the inner diameter. In contrast, the central lobes 28 have their root tangentially disposed at the longitudinal side of the half shell part 26 or the shank 19, and likewise extend rectilinearly so that they protrude externally, which means that their outer edge overlaps the outer diameter of the completed expander element 14 substantially more than do the end lobes 27. In the assembled device 11 the result is to provide barb-like edge portions 42 which at the commencement of the tightening or fastening operation movement hold the bolt 11 in the bored hole. From FIG. 3, and in connection with the lower part 26, the extent to which the lobes 27 and particularly the lobes 28 project beyond the joint between the cylindrical zone 21 and the shank 19 and thus the outer diameter of the bolt 12 can be seen. This also applies to the lobes 27' and 28' of the part 26'.

Figure 5:
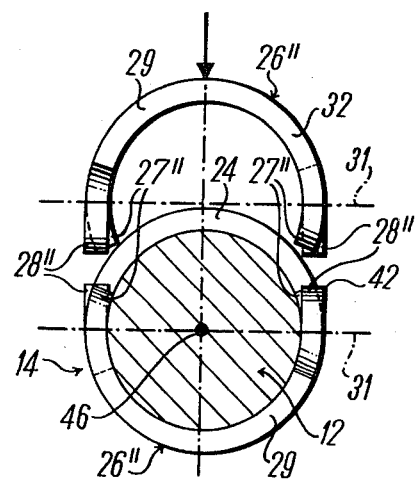
FIG. 5 is a section similar to that of FIG. 3 but illustrating a further embodiment.

The same applies to the embodiment of FIG. 5. In this embodiment, however, the outer lobes 27" follow the radius, while the inner lobes 28" extend tangentially from the plane of separation 31.

Here also there are barb-like edge portions 42. In addition, the parts 26" of the expander element 14 overlap the cylindrical zone 21 of the bolt 12 so as to be radially snapped thereon and hold the elements against separation. It will be understood that in both cases (FIGS. 3 and 5) the other lobes in each case will be correspondingly formed.

FIG. 2 illustrates, as a first example, the parts 26 of the expander element 14. According to this illustration, each part 26 is so formed initially, that is to say before being placed on the bolt 12, that the outer edge of the end lobes 27 extend outwardly from the end surface 32 of the body part 29, by the formation of a projection 33. The rear of the lobe 27 is rounded as is the adjoining rear of the central lobe 28 of this same part 26. This central lobe 28 is provided towards the end surface 32 of the body part 29 with a trough 37 forming a peak projection 36. This trough extends substantially perpendicularly into the end surface 32. The trough 37 is of such form that the rear of the end lobe 27 fits thereinto to form a form-locking connection. The section between each end lobe 27 and each central lobe 28 is intended and shaped for connecting the central lobe 28 of the other half shell part 26 therewith. As can be seen from FIGS. 2 and 3, two half shell parts 26 forming an expander element 14 are disposed and pushed into engagement with one another on the cylindrical zone 21 of the bolt 12 in such a way as to form the connection illustrated in the developed view in FIG. 2, which at first only holds firmly in the axial direction. The insertion of the lobes 27 and 28 is effected without resistance. In this condition, the two parts 26 are relative to one another in the axial direction but do not exhibit a form-locking connection in the radial direction, so that they could still be separated (fall apart). To provide radial security against such an event, a tool indicated at 38 is applied in the direction as shown by arrow A. The shoulder 24 at the transition between the cylindrical zone 21 and the shank 19 of the bolt 12 serves as a counter resistance. As a result, the end lobes 27 are deformed into the troughs 37 so as to produce the arrangement illustrated in FIG. 1 in which the leading edges of the end lobes 27 are substantially coplanar with the end surface 32 of the body part 29. Even if, in view of the hardening of the half-shell part 26, only an incomplete deformation takes place on account of the elasticity which is still then present, the lobes 27 and 28 mutually interengage to such an extent that the parts 26 are not able to fall apart under their own weight, that is to say the form-locking connection can also have considerable amount of play. The deformation itself will be promoted: in the first place by the fact that the tool 38 and the support 24 bear against a narrow annular surface formed by the projection 33; in the second place by the fact that the end lobes 27 have a constriction 39 in the zone where they adjoin the body part 29 which forms a pivot for the deformation; and in the third place in that the peak projections 36 of the central lobes 28 press or are applied against this constriction 39.

Figures 4A, 4B:
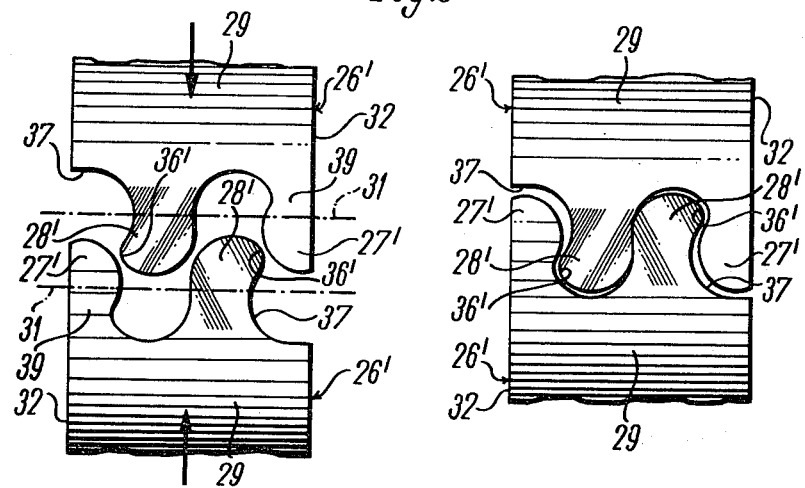
FIGS. 4a and 4b are plan views of the element respectively before and after the assembly in accordance with another embodiment of the present invention.

In the second embodiment of the present invention illustrated in FIGS. 4a and 4b the parts 26' of the expander element 14 are so formed that there is no deformation of the end lobes 27' during the assembly on the bolt 12. Rather, a clip, or snap interconnection in the axial direction between the lobes 27' and 28' provides the radial hold against separation of the expander element 14. The difference between this embodiment and the embodiment previously described is primarily only the form of the end lobes 27'. The outer edges of the lobes 27' are formed ready for assembly and aligned with the end surface 32 of the body part 29. In addition, the peak projection of the lobe 28' can be formed as a rounded projection 36' for considerably better slidability.

The starting condition is illustrated in FIG. 4a prior to the two expander element parts 26' being snapped into one another. As can be seen from the figure, the rounded projection 36' of the central lobe 28' will bear against the back of the end lobe 27'. In view of the hardness of the part 26' and the constriction 39 of the end lobe 27', and to some extent also of the central lobe 28' the lobes will yield resiliently so that the two parts 26', after overcoming a certain amount of counter pressure, can be snapped into one another to produce the connection illustrated in FIG. 4b. The lobes 27' and 28' can be so shaped that in the assembled and mounted condition of FIG. 4b there is a greater amount of play because, generally speaking, only a very small form-locking connection will radially hold the parts 26' sufficiently.

Figures 6A, 6B:
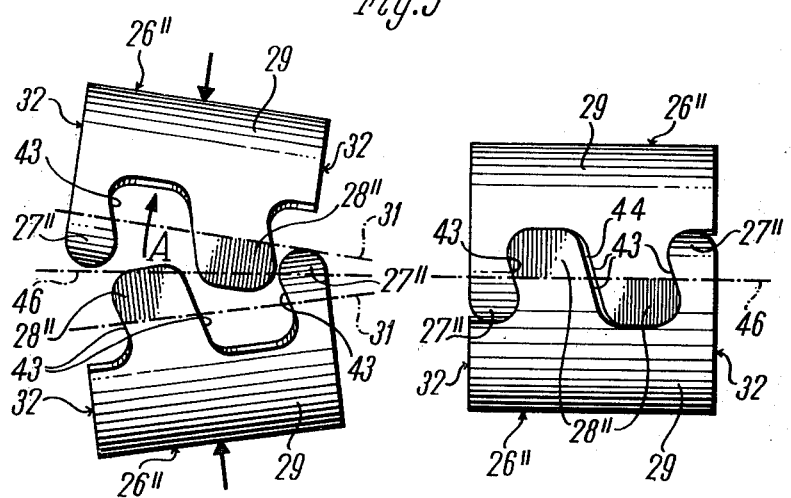
FIGS. 6a and 6b are plan views corresponding to FIGS. 4a and 4b and related to the embodiment of FIG. 5.

In the third embodiment of the invention illustrated in FIGS. 5, 6a and 6b, the expander element parts 26" are formed such that when mounted on the bolt 12 they both hold one another in position and also on the cylindrical zone 21 of the bolt. This latter effect, as mentioned, results from the fact that the outer lobes 27" when slipped onto the zone 21 of the bolt are elastically enlarged in the radial direction. The first effect is achieved by the special construction of the inner surfaces or edges of the lobes 27" and 28" so that they coincide with the generating of the cylindrical zone 21. Whilst the outer edges of the lobes 27", in each case, constitute an extension of the rectilinear end surfaces 32 of the part 26", the inner lateral edges 43 which are not parallel to the longitudinal axis of the parts 26" are arranged at an acute angle to the end surfaces 32 or to the transverse medial plane. The individual edges 43 of the lobes 27" and 28" which interengage or lay side-by-side are parallel to one another. Whilst the inner lobes 28" are somewhat of parallelogram form, albeit with rounded corners, the outer lobes 27" are of somewhat club-like, that is to say they are thickened at their leading free ends.

The procedure for mounting the two parts 26" of the expander element on the cylindrical zone 21 of the bolt is seen in FIGS. 6a and 6b, in which only the longitudinal axis 46 of the threaded bolt 12 is shown. The two parts 26" of the expander element are placed on the cylindrical zone 21 from the two sides of the bolt so that their longitudinal axes are at an acute angle to one another, the open sides preferably being directed towards the cone 22. The opening angle of the two parts 26" is largely constituted by the acute angle which the inner edges 43 of the lobes 27" and 28" form with the transverse medial plane, because in the condition illustrated in FIG. 6a the extension of these inner edges 43 of the upper part 26" is perpendicular to the longitudinal axis of the lower part 26". The longitudinal axes of the two parts 26", however, do not run parallel in the plane of the drawing but intersect in this plane at an acute angle. Also, it is necessary for the inner lobe 28" of the upper part 26" to be able to engage in the righthand slot formed by the inner lobe 28" and outer lobe 27" of the lower part 26". If the two parts 26" are pressed together on the cylindrical zone 21 of the bolt, they first turn in the plane of the drawing and secondly in the direction of arrow A parallel to one another so that they will snap one into the other and assume the position shown in FIG. 6b.

As can be seen from this FIG. 6b, the opposed inner edges 43 of the two adjacent inner lobes 28" of the two parts 26" define between them a gap 44 which in effect facilitates, on the one hand, the form-locking interengagement of the parts 26", and on the other hand, also has a favorable effect on the permissible manufacturing tolerances. In the position illustrated in FIG. 6b the righthand end surfaces 32, in relation to this figure, are applied against the collar or shoulder 24 of the zone 19 of the bolt, while the inner end surfaces 32 (as related to FIG. 6b) bears against a part of the cone 22. This means that the two parts 26" of the expander element can not move in practice in the axial direction so that any radial parting of the two parts is no longer possible by virtue of the oblique edges 43. It will be understood that this interfitting, form-locking connection, effective in the radial direction can be achieved even in the absence of the form-locking snapping together of the two parts 26" over the zone 21 of the bolt, because the two parts 26" of the expander element are fixed in the axial direction between the cone 22 and the shoulder 24 with negligible play.

By reason of the point-symmetrical construction of the parts 26, 26', 26" of the expander element 14 and the simple form-locking engagement producing a radial holding of the parts, the mounting of the expander element 14 on the externally threaded bolt 12 can be carried out mechanically, that is to say automatically. The individual separator element parts 26, 26', 26" are of a nature that they are readily sorted, i.e., graded and orientated, because it is of no moment which end surface 32 is leading or trailing. Moreover, the final connection of the two parts 26, 26', 26" on the bolt 12 can take place by simple pressure in the axial direction for the deformation of the end lobes 27, or by simple pressure in the radial direction to produce the snap-in connection of the two parts 26' and 26" with one another or with the bolt.

As can be seen from FIG. 1, when the expander element is mounted over the cylindrical zone 21 of the bolt 12, the outer diameter of the expander element 14 can slightly overlap the outer diameter of the shank 19 in the zone of the body part 29. The hole 41 in which the externally threaded peg 11 is inserted has an internal diameter equal to the outer diameter of the shank 19. This means that the externally threaded peg 11 is driven into the hole 41 with the expander element 14 being pressed in and bearing against the shoulder 24 and, within the hole 41, particularly because of the barb-like edge portions 42, constituted by the projecting lobes 28, 28', 28", is therein clamped. The externally threaded peg 11 is driven in until the end 13 arranged at the beginning portion of the threaded section 16 bears against the edge of the object which is to be fastened in position. The nut is then turned so that the threaded bolt 12 is pulled out of the hole 41. Because of the initial clamping of the expander element 14 within the hole 41 it remains stationary so that the cone 22 of the bolt 12 slides into the expander element 14 and this is pressed radially outwards and affords an increase in the clamping effect. The bolt 12 is drawn out in this way until the marker ring 18 is visible, in which condition the expander element 14 is over the maximum diameter of the cone 22, i.e., has performed its maximum expansion. Since the parts 26 are held stationary in the axial direction against one another, the necessary firm hold is securely established.

What is claimed and desired to be secured by Letters Patent of the United States is:

1. A device for fastening an object to a wall, or the like, as a plug-in mounting, comprising:
   a bolt having an externally threaded portion at one end and an expander element mounting portion at the other end, the expander element mounting portion including a partially conical section, the maximum diameter of which is equal to the maximum diameter of the bolt;
   a nut for threadedly engaging the threaded portion; and
   an expander element including a pair of substantially half-shell parts each having a body part with opposed longitudinal edges and opposed transverse edges, each opposed longitudinal edge having at least one end lobe and at least one central lobe formed thereon, such that each half-shell part is transversely symmetrical, and, when viewed in development, is point symmetrical, and further such that a radial form-locking connection of the half-shell parts with the expander element mounting portion of the bolt is achieved, the half-shell parts being retained near their transverse edges and restrained from relative longitudinal displacement.

2. The device as defined in claim 1, wherein:
   (i) a pair of lobes is formed on each opposed longitudinal edge of each half-shell part, the lobes in each pair being characterized as an end lobe and a central lobe, with the location of the end lobe being closer to a respective transverse edge than the location of the central lobe to the other transverse edge;
   (ii) the central lobe of each pair of lobes is received within the space defined between the lobes of an adjacent pair of lobes of the other half-shell part to establish the form-locking connection; and
   (iii) the end lobe of each pair of lobes is received within the space between the central lobe and its respective transverse edge of an adjacent pair of lobes of the other half-shell part to establish the form-locking connection.

3. The device as defined in claim 2, wherein:
   (iv) each half-shell part defines a plane of separation; and
   (v) each lobe has an extent on each side of the plane of separation.

4. The device as defined in claim 3, wherein:
   (vi) one lobe of each pair of lobes extends tangentially to the plane of separation; and
   (vii) the other lobe of each pair of lobes extends radially.

5. The device as defined in claim 3, wherein:
   (vi) one lobe of each pair of lobes has a radius which is substantially similar to the radius of the body part; and
   (vii) the other lobe of each pair of lobes extends substantially tangentially.

6. The device as defined in claim 3, wherein:
   (vi) one lobe of each pair of lobes has a radius which is substantially similar to the radius of the body part; and
   (vii) the other lobe of each pair of lobes extends substantially radially.

7. A device for fastening an object to a wall, or the like, as a plug-in mounting, comprising:
   a bolt, having an externally threaded portion at one end and an expander element mounting portion at the other end, the expander element mounting portion including a partially conical section, the maximum diameter of which is equal to the maximum diameter of the bolt;
   a nut for threadedly engaging the threaded portion; and
   an expander element including a pair of substantially half-shell parts each having a body part with opposed longitudinal edges and opposed transverse edges, each opposed longitudinal edge having at least one end lobe and at least one central lobe formed thereon, such that each half-shell part is transversely symmetrical, and, when viewed in development, is point symmetrical, and further such that a radial form-locking connection of the half-shell parts with the expander element mounting portion of the bolt is achieved by an axial snap fit forced engagement of the lobes, the half-shell parts being retained near their transverse edges and restrained from relative longitudinal displacement.

8. A device for fastening an object to a wall or the like, as a plug-in mounting, comprising:
   a bolt, having an externally threaded portion at one end and an expander element mounting portion at the other end, the expander element mounting portion including a partially conical section, the maximum diameter of which is equal to the maximum diameter of the bolt, and an annular shoulder;
   a nut for threadedly engaging the threaded portion; and
   an expander element including a pair of substantially half-shell parts each having a body part with opposed longitudinal edges and opposed transverse edges, each opposed longitudinal edge having at least one end lobe and at least one central lobe formed thereon, such that each half-shell part is transversely symmetrical, and, when viewed in development, is point symmetrical, and further such that a radial form-locking connection of the half-shell parts with the expander element mounting portion of the bolt is achieved, the half-shell parts being retained near their transverse edges and restrained from relative longitudinal displacement, wherein:
   (i) each lobe includes an inner surface inboard of its respective transverse edge;
   (ii) each inner surface is subtantially rectilinear and inclined to the transverse plane of its half-shell part; and
   (iii) each lobe includes an outer surface with the outer surface of certain lobes being coplanar with a respective transverse edge, and with the outer surface on one end of the expander element being in engagement with the annular shoulder and the outer surface on the other end of the expander element being in engagement with the partially conical section.

9. A device for fastening an object to a wall, or the like, as a plug-in mounting, comprising:
   a bolt having an externally threaded portion at one end and an expander element mounting portion at the other end, the expander element mounting portion including a partially conical section, the maximum diameter of which is equal to the maximum diameter of the bolt;

a nut for threadedly engaging the threaded portion; and an expander element including a pair of substantially half-shell parts each having a body part with opposed longitudinal edges and opposed transverse edges, each opposed longitudinal edge having at least one lobe formed thereon, such that each half-shell part is transversely symmetrical, and, when viewed in development, is point symmetrical, and further such that a radial form-locking connection of the half-shell parts with the expander element mounting portion of the bolt is achieved, the half-shell parts being restrained from relative longitudinal displacement, wherein:
(i) a pair of lobes is formed on each opposed longitudinal edge of each half-shell part, the lobes in each pair being characterized as an end lobe and a central lobe, with the location of the end lobe being closer to a respective transverse edge than the location of the central lobe to the other transverse edge;
(ii) the central lobe of each pair of lobes is received within the space defined between the lobes of an adjacent pair of lobes of the other half-shell part to establish the form-locking connection; and
(iii) the end lobe of each pair of lobes is received within the space between the central lobe and its respective transverse edge of an adjacent pair of lobes of the other half-shell part to establish the form-locking connection.

10. The device as defined in claim 9, wherein:
(iv) the form-locking connections are achieved by axial deformation of the end lobes of each pair of lobes of each half-shell part.

11. The device as defined in claim 10, wherein:
(v) the space between the central lobe and its respective transverse edge of each pair of lobes includes a trough defined in the central lobe; and
(vi) the end lobe of each pair of lobes is profiled axially such that it overlaps its respective transverse edge, the axial deformation of the end lobes causing the end lobes to engage said central lobe of said adjacent pair of lobes within the trough of said central lobe to establish said form-locking connection.

12. The device as defined in claim 11, wherein:
(vii) each end lobe includes a constriction adjacent the body part.

13. The device as defined in claim 11, wherein:
(vii) each end lobe includes, at its free end, a projection which extends outboard of its respective transverse edge.

14. The device as defined in claim 10, further comprising:
a tool; and wherein:
(v) the bolt further has an annular shoulder; and
(vi) the end lobes of each half-shell part engage the annular shoulder and the tool, said engagement insuring the axial deformation of the end lobes when a relative displacement occurs between the tool and the annular shoulder.

15. The device as defined in claim 9, wherein:
(iv) each end lobe includes a constriction adjacent the body part;
(v) the space between the central lobe and its respective transverse edge of each pair of lobes includes a trough defined in the central lobe, said trough terminating, at one end, in a peak projection which engages an adjacent mating end lobe at its constriction.

16. The device as defined in claim 9, wherein:
(iv) the force-locking connections are achieved by an axial snap fit forced engagement of the lobes.

17. The device as defined in claim 9, wherein:
(iv) each end lobe includes an inner surface inboard of its respective transverse edge, and each central lobe includes a pair of inner surfaces inboard of its respective transverse edge;
(v) each inner surface is substantially rectilinear and inclined to the transverse plane of its half-shell part;
(vi) the bolt further has an annular shoulder; and
(vii) the outer surface of each end lobe is coplanar with its respective transverse edge, with the outer surfaces on one end of the expander element being an engagement with the annular shoulder and the outer surfaces on the other end of the expander element being in engagement with the partially conical section.

18. The device as defined in claim 17, wherein:
(viii) a gap is formed between at least two adjacent inner surfaces of the expander element.

19. A device for fastening an object to a wall, or the like, as a plug-in mounting, comprising:
a bolt having an externally threaded portion at one end and an expander element mounting portion at the other end, the expander element mounting portion including a partially conical section, the maximum diameter of which is equal to the maximum diameter of the bolt;

a nut for threadedly engaging the threaded portion; and an expander element including a pair of substantially half-shell parts each having a body part with opposed longitudinal edges and opposed transverse edges, each opposed longitudinal edge having at least one lobe formed thereon, such that each half-shell part is transversely symmetrical, and, when viewed in development, is point symmetrical, and further such that a radial form-locking connection of the half-shell parts with the expander element mounting portion of the bolt is achieved, the half-shell parts being restrained from relative longitudinal displacement, wherein:
(i) a set of lobes is formed on each opposed longitudinal edge of each half-shell part, the lobes in each set being characterized as an end lobe and at least one central lobe, with the location of the end lobe being closer to a respective transverse edge than the location of a central lobe to the other transverse edge;
(ii) the central lobes of each set of lobes is received within a space defined between the lobes of an adjacent set of lobes of the other half-shell part to establish the form-locking connection; and
(iii) the end lobe of each set of lobes is received within the space between a central lobe and its respective transverse edge of an adjacent set of lobes of the other half-shell part to establish the form-locking connection.

* * * * *